United States Patent
McWilliams

(10) Patent No.: US 9,519,630 B2
(45) Date of Patent: Dec. 13, 2016

(54) FAST CSS PARSER ENGINEERED FOR RUNTIME USE

(71) Applicant: salesforce.com, inc., San Francisco, CA (US)

(72) Inventor: Nathan David McWilliams, Atlanta, GA (US)

(73) Assignee: salesforce.com, inc., San Francisco, CA (US)

( * ) Notice: Subject to any disclaimer, the term of this patent is extended or adjusted under 35 U.S.C. 154(b) by 157 days.

(21) Appl. No.: 14/320,198

(22) Filed: Jun. 30, 2014

(65) Prior Publication Data

US 2015/0378966 A1    Dec. 31, 2015

(51) Int. Cl.
| | | |
|---|---|---|
| *G06F 17/00* | (2006.01) | |
| *G06F 17/22* | (2006.01) | |
| G06F 17/30 | (2006.01) | |
| G06F 17/24 | (2006.01) | |
| G06F 9/44 | (2006.01) | |

(52) U.S. Cl.
CPC ......... *G06F 17/227* (2013.01); *G06F 17/2247* (2013.01); *G06F 8/30* (2013.01); *G06F 8/38* (2013.01); *G06F 9/4443* (2013.01); *G06F 17/243* (2013.01); *G06F 17/247* (2013.01); *G06F 17/248* (2013.01); *G06F 17/3089* (2013.01); *G06F 17/30893* (2013.01); *G06F 17/30905* (2013.01)

(58) Field of Classification Search
CPC .............. G06F 17/227; G06F 17/30893; G06F 17/2247; G06F 17/243; G06F 17/247–17/248;G06F 17/30905; G06F 17/30809; G06F 17/30896; G06F 9/4443; G06F 9/30; G06F 9/38
USPC ......................................... 715/234–235, 237
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |

(Continued)

*Primary Examiner* — Quoc A Tran
(74) *Attorney, Agent, or Firm* — Haynes Beffel & Wolfeld LLP; Ernest J. Beffel, Jr.

(57) ABSTRACT

The technology disclosed relates to systems and methods for providing a CSS parser engineered for runtime usage to improve the maintainability of code that displays data to users. The technology disclosed also improves the performance and consistency of the code that delivers a user's experience.

19 Claims, 12 Drawing Sheets

(56) References Cited

U.S. PATENT DOCUMENTS

| | | |
|---|---|---|
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,069,497 B1 | 6/2006 | Desai |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,603,483 B2 | 10/2009 | Psounis et al. |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,543,668 B1 * | 9/2013 | Long .............. G06F 17/30864 709/217 |
| 8,566,301 B2 | 10/2013 | Rueben et al. |
| 8,646,103 B2 | 2/2014 | Jakobson et al. |
| 8,756,275 B2 | 6/2014 | Jakobson |
| 8,769,004 B2 | 7/2014 | Jakobson |
| 8,769,017 B2 | 7/2014 | Jakobson |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0149618 A1 * | 10/2002 | Estrada ................ G06Q 10/10 715/760 |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0173967 A1 * | 7/2012 | Lillesveen ............ G06F 17/227 715/235 |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0247216 A1 | 9/2013 | Cinarkaya et al. |
| 2015/0135061 A1 * | 5/2015 | Palanichamy ...... G06F 17/2247 715/235 |

\* cited by examiner

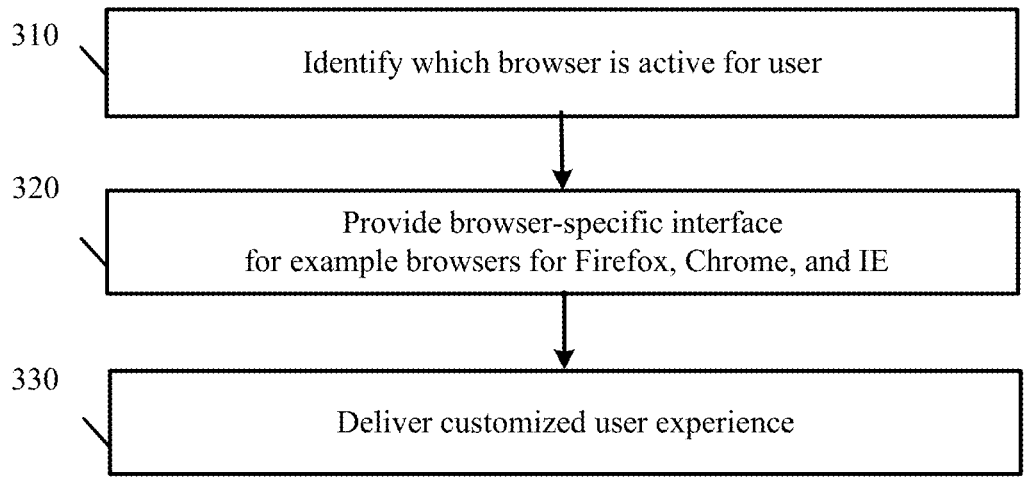
FIG. 3A Browser Customization - Vendor Prefixing
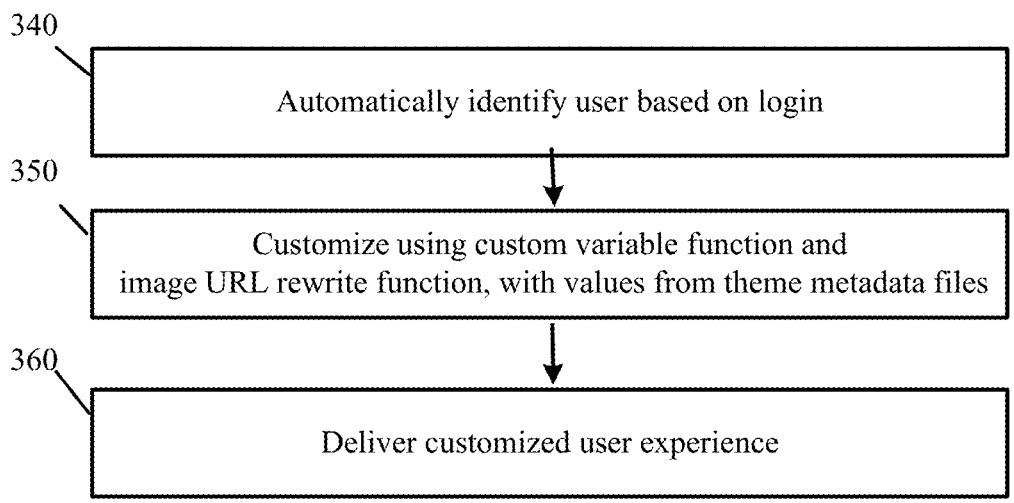
FIG. 3B CustomVariable Function and Image URL Rewrite Function

400A

```
                      ┌─ 410
ParserJavaSetup.java ─┘ private String parse(String input) throws IOException {
    StyleWriter verbose = StyleWriter.verbose();
    StandardValidation validation = new StandardValidation();
                        ┌─ 412
    // vendor prefixing ┘
    Prefixer prefixer = Prefixer.defaultBrowserSupport();
    prefixer.support().all(Browser.FIREFOX);
    prefixer.support().all(Browser.CHROME);
    prefixer.support().all(Browser.IE);
                              ┌─ 414
    // variables custom function ┘
    String themeName = "two";
    File theme = new File(context.getRealPath(String.format(THEME_PATH, themeName)));
    CustomVariables variables = new CustomVariables(theme);
                      ┌─ 416
    // image url rewrite ┘
    ImageUrlRewrite urls = new ImageUrlRewrite();

Omakase.source(input)
      .request(validation)
      .request(verbose)
      .request(prefixer)
      .request(variables)
      .request(urls)
      .process();

return verbose.write();
  }
```

FIG. 4A ParserJavaSetup.java

400B

```
Rework1-CustomVariables.java ____/— 420 package com.salesforce.omakase.server;

import com.google.common.base.Charsets;
import com.google.common.io.Files;
import com.salesforce.omakase.ast.declaration.RawFunction;
import com.salesforce.omakase.broadcast.Broadcaster;
import com.salesforce.omakase.parser.ParserFactory;
import com.salesforce.omakase.parser.Source;
import com.salesforce.omakase.parser.refiner.FunctionRefiner;
import com.salesforce.omakase.parser.refiner.GenericRefiner;
import com.salesforce.omakase.parser.refiner.RefinerRegistry;
import com.salesforce.omakase.plugin.SyntaxPlugin;
import com.salesforce.omakase.util.Args;
import org.yaml.snakeyaml.Yaml;

import java.io.File;
import java.io.IOException;
import java.util.List;
import java.util.Map;
                                                   /— 422
public class CustomVariables implements SyntaxPlugin {
    private static final Yaml yaml = new Yaml();

private final VariableFunction variableFunction;

public CustomVariables(File theme) throws IOException {
        String themeSource = Files.toString(theme, Charsets.UTF_8);
        Map<String, String> variables = (Map)yaml.load(themeSource);
        variableFunction = new VariableFunction(variables);
    }

@Override
    public void registerRefiners(RefinerRegistry registry) {
        registry.register(variableFunction);
    } public static final class VariableFunction implements FunctionRefiner {
        private final Map<String, String> variables;

public VariableFunction(Map<String, String> variables) {
            this.variables = variables;
        }

@Override
        public boolean refine(RawFunction raw, Broadcaster broadcaster, GenericRefiner refiner) {
            if (!raw.name().equals("v")) return false;

List<String> args = Args.get(raw.args());
            if (args.size() != 2) throw new RuntimeException("Expected to find two args");

String name = args.get(0);
            String fallback = args.get(1);
            String resolved = variables.containsKey(name) ? variables.get(name) : fallback;

Source source = new Source(resolved, raw.line(), raw.column());
            ParserFactory.termSequenceParser().parse(source, broadcaster, refiner);

return true;
        }
    }
}
```

FIG. 4B Rework1-CustomVariables.java

400C

```
source.html        ╱─ 430
<!doctype>

<html>
  <head>
    <meta charset="UTF-8">
    <title>salesforce.com - Customer login</title>
    <link href="/css/page" rel="stylesheet">
    <link href="/css/login" rel="stylesheet">
  </head>
<body>
  <main class="content">
    <div class="login-panel">
      <div class="before">
        <div class="logo">
          <img src="/resources/img/s.png" class="logo-img"/>
        </div>
        <div class="login-input">
          <input type="email" name="email" placeholder="User Name" class="first"/>
          <input type="password" name="password" placeholder="Password" class="last"/>
          <button class="login-button">Log in to Salesforce</button>
        </div>
      </div>
      <div class="after">
        <iframe src="https://www.salesforce.com/login-messages/messages.html?noroundedcorner" class="marketing"
           scrolling="no"></iframe>
      </div>
    </div>
    <div class="copyright">Copyright 2000-2014 salesforce.com, inc. All rights reserved.</div>
  </main>
</body>
</html> css-original-a.css    ╱─ 432
body {
  font-weight: 300;
  font-family: v(main-font, Helvetica);
  background: v(main-color, white);
} css-output-theme1-a.css   ╱─ 433
body {
  font-weight: 300;
  font-family: Helvetica;
  background: #2a94d6;
} css-output-theme2-a.css   ╱─ 434
body {
  font-weight: 300;
  font-family: Verdana;
  background: #cc3300;
} metadata-theme1.yaml   ╱─ 436
main-color: "#2a94d6"
main-font: Helvetica
logo: url(/resources/img/logo1.png)

metadata-theme2.yaml   ╱─ 437
main-color: "#cc3300"
main-font: Verdana
logo: url(/resources/img/logo2.png)
```

FIG. 4C source.html, css-original-a.css, css-output-theme1-a.css, css-output-theme2-a.css, metadata-theme1.yaml, metadata-theme2.yaml

400D

Rework2-ImageUrlRewrite.java ⟋ 440

```java
package com.salesforce.omakase.server;

import com.salesforce.omakase.ast.declaration.UrlFunctionValue;
import com.salesforce.omakase.broadcast.annotation.Rework;
import com.salesforce.omakase.plugin.Plugin;

public class ImageUrlRewrite implements Plugin {
  private static final long TIMESTAMP = System.currentTimeMillis();

@Rework
  public void rewrite(UrlFunctionValue urlFunction) {
    if (!urlFunction.url().contains("?")) {
      urlFunction.url(urlFunction.url() + "?cb=" + TIMESTAMP);
    }
  }
}
```

FIG. 4D Rework2-ImageUrlRewrite.java

400E

```
css-original-b.css       ─── 450
.content {
  width: 800px;
  margin: 60px auto;
}

.login-panel {
  display: flex;
  border-radius: 3px;
  box-shadow: 0px 2px 7px rgba(0, 0, 0, 0.40);
  margin: 50px auto 10px auto;
  padding: 10px;
  background: linear-gradient(#fafafa, #e5e5e5);
}

.login-panel .before {
  width: 320px;
}

.logo {
  text-align: center;
  margin: 30px 0 10px;
}

.logo > img {                  ─── 452
  background: v(logo, "url
    (/resources/img/logo1.png)") center no-repeat;
  width: 230px;
  height: 110px;
}

.login-input {
  margin: 0 20px;
}

.login-input input {
  display: inline-block;
  width: 100%;
  border: 1px solid #ccc;
  padding: 15px;
  margin: 0;
}

.login-input .first {
  padding-left: 40px;
  background: #f3f5f6 url
    (/resources/img/user188.png) 6px 9px no-repeat;
  box-shadow: inset 0px 1px 1px 0px rgba(0,0,0,0.2);
  border-top-left-radius: 3px;
  border-top-right-radius: 3px;
}
```

```
.login-input .last {
  border-top: 0;
  padding-left: 40px;
  background: #f3f5f6 url(/resources/img/lock188.png) 6px 9px
no-repeat;
  border-bottom-left-radius: 3px;
  border-bottom-right-radius: 3px;
}

.login-button {
  cursor: pointer;
  margin-top: 10px;
  width: 100%;
  border: 1px solid #4176ba;
  color: white;
  font-size: 17px;
  padding: 9px 20px;
  border-radius: 3px;
  font-weight: 300;                    ─── 454
  font-family: v(main-font, Helvetica);
  background: linear-gradient
    (to top, #2789c7 0%, #3f9fd9 100%);
  text-shadow: 0px -1px 0px rgba(0,0,0,0.3);
}

.login-panel .after {
  overflow: hidden;
}

.marketing {
  margin: 0;
  padding: 0;
  width: 478px;
  height: 397px;
  border: 0;
  overflow: hidden;
}

.copyright {
  font-size: 10px;
  color: #ffffff;
  text-align: center;
}
```

FIG. 4E css-original-b.css

400F

```css
css-output-theme1-b.css          ⟵ 460

.content {
  width: 800px;
  margin: 60px auto;
}

.login-panel {
  display: flex;
  -webkit-border-radius: 3px;
  -moz-border-radius: 3px;        ⟵ 462
  border-radius: 3px;
  -webkit-box-shadow: 0px 2px 7px rgba(0, 0, 0, 0.40);
  -moz-box-shadow: 0px 2px 7px rgba(0, 0, 0, 0.40);
  box-shadow: 0px 2px 7px rgba(0, 0, 0, 0.40);
  margin: 50px auto 10px auto;
  padding: 10px;
  background: -webkit-linear-gradient(#fafafa, #e5e5e5);
  background: -moz-linear-gradient(#fafafa, #e5e5e5);
  background: linear-gradient(#fafafa, #e5e5e5);
}

.login-panel .before {
  width: 320px;
}

.logo {
  text-align: center;
  margin: 30px 0 10px;
}

.logo > img {                     ⟵ 464
  background: url(/resources/img/
  logo1.png?cb=1400704769893) center no-repeat;
  width: 230px;
  height: 110px;
}

.login-input {
  margin: 0 20px;
}

.login-input input {
  display: inline-block;
  width: 100%;
  border: 1px solid #ccc;
  padding: 15px;
  margin: 0;
}

.login-input .first {
  padding-left: 40px;
  background: #f3f5f6 url(/resources/img/
  user188.png?cb=1400704769893) 6px 9px no-repeat;
  -webkit-box-shadow: inset 0px 1px 1px 0px rgba(0,0,0,0.2);
  -moz-box-shadow: inset 0px 1px 1px 0px rgba(0,0,0,0.2);
  box-shadow: inset 0px 1px 1px 0px rgba(0,0,0,0.2);
  -webkit-border-top-left-radius: 3px;
  -moz-border-top-left-radius: 3px;
  border-top-left-radius: 3px;
  -webkit-border-top-right-radius: 3px;
  -moz-border-top-right-radius: 3px;
  border-top-right-radius: 3px;
}
```

```css
.login-input .last {
  border-top: 0;
  padding-left: 40px;
  background: #f3f5f6 url(/resources/img/
  lock188.png?cb=1400704769893) 6px 9px no-repeat;
  -webkit-border-bottom-left-radius: 3px;
  -moz-border-bottom-left-radius: 3px;
  border-bottom-left-radius: 3px;
  -webkit-border-bottom-right-radius: 3px;
  -moz-border-bottom-right-radius: 3px;
  border-bottom-right-radius: 3px;
}

.login-button {
  cursor: pointer;
  margin-top: 10px;
  width: 100%;
  border: 1px solid #4176ba;
  color: white;
  font-size: 17px;
  padding: 9px 20px;
  -webkit-border-radius: 3px;
  -moz-border-radius: 3px;
  border-radius: 3px;
  font-weight: 300;                ⟵ 466
  font-family: Helvetica;
  background: -webkit-linear-gradient
    (bottom, #2789c7 0%, #3f9fd9 100%);
  background: -moz-linear-gradient
    (bottom, #2789c7 0%, #3f9fd9 100%);
  background: linear-gradient(to top, #2789c7 0%, #3f9fd9 100%);
  text-shadow: 0px -1px 0px rgba(0,0,0,0.3);
}

.login-panel .after {
  overflow: hidden;
}

.marketing {
  margin: 0;
  padding: 0;
  width: 478px;
  height: 397px;
  border: 0;
  overflow: hidden;
}

.copyright {
  font-size: 10px;
  color: #ffffff;
  text-align: center;
}
```

FIG. 4F css-output-theme1-b.css

400G

```
css-output-theme2-b.css
                                    ⌢ 470
.content {
  width: 800px;
  margin: 60px auto;
}

.login-panel {
  display: flex;
  -webkit-border-radius: 3px;
  -moz-border-radius: 3px;
  border-radius: 3px;
  -webkit-box-shadow: 0px 2px 7px rgba(0, 0, 0, 0.40);
  -moz-box-shadow: 0px 2px 7px rgba(0, 0, 0, 0.40);
  box-shadow: 0px 2px 7px rgba(0, 0, 0, 0.40);
  margin: 50px auto 10px auto;
  padding: 10px;
  background: -webkit-linear-gradient(#fafafa, #e5e5e5);
  background: -moz-linear-gradient(#fafafa, #e5e5e5);
  background: linear-gradient(#fafafa, #e5e5e5);
}

.login-panel .before {
  width: 320px;
}

.logo {
  text-align: center;
  margin: 30px 0 10px;
}

.logo > img {                       ⌢ 472
  background: url(/resources/img/
logo2.png?cb=1400704769893) center no-repeat;
  width: 230px;
  height: 110px;
}

.login-input {
  margin: 0 20px;
}

.login-input input {
  display: inline-block;
  width: 100%;
  border: 1px solid #ccc;
  padding: 15px;
  margin: 0;
}

.login-input .first {
  padding-left: 40px;
  background: #f3f5f6 url(/resources/img/
user188.png?cb=1400704769893) 6px 9px no-repeat;
  -webkit-box-shadow: inset 0px 1px 1px 0px rgba(0,0,0,0.2);
  -moz-box-shadow: inset 0px 1px 1px 0px rgba(0,0,0,0.2);
  box-shadow: inset 0px 1px 1px 0px rgba(0,0,0,0.2);
  -webkit-border-top-left-radius: 3px;
  -moz-border-top-left-radius: 3px;
  border-top-left-radius: 3px;
  -webkit-border-top-right-radius: 3px;
  -moz-border-top-right-radius: 3px;
  border-top-right-radius: 3px;
}
```

```
.login-input .last {
  border-top: 0;
  padding-left: 40px;
  background: #f3f5f6 url(/resources/img/
lock188.png?cb=1400704769893) 6px 9px no-repeat;
  -webkit-border-bottom-left-radius: 3px;
  -moz-border-bottom-left-radius: 3px;
  border-bottom-left-radius: 3px;
  -webkit-border-bottom-right-radius: 3px;
  -moz-border-bottom-right-radius: 3px;
  border-bottom-right-radius: 3px;
}

.login-button {
  cursor: pointer;
  margin-top: 10px;
  width: 100%;
  border: 1px solid #4176ba;
  color: white;
  font-size: 17px;
  padding: 9px 20px;
  -webkit-border-radius: 3px;
  -moz-border-radius: 3px;
  border-radius: 3px;
  font-weight: 300;              ⌢ 474
  font-family: Verdana;
  background: -webkit-linear-gradient(bottom, #2789c7 0%, #3f9fd9
100%);
  background: -moz-linear-gradient(bottom, #2789c7 0%, #3f9fd9
100%);
  background: linear-gradient(to top, #2789c7 0%, #3f9fd9 100%);
  text-shadow: 0px -1px 0px rgba(0,0,0,0.3);
}

.login-panel .after {
  overflow: hidden;
}

.marketing {
  margin: 0;
  padding: 0;
  width: 478px;
  height: 397px;
  border: 0;
  overflow: hidden;
}

.copyright {
  font-size: 10px;
  color: #ffffff;
  text-align: center;
}
```

FIG. 4G css-output-theme2-b.css

FIG. 5A  Sample User Experience with Theme 1 Parser Output
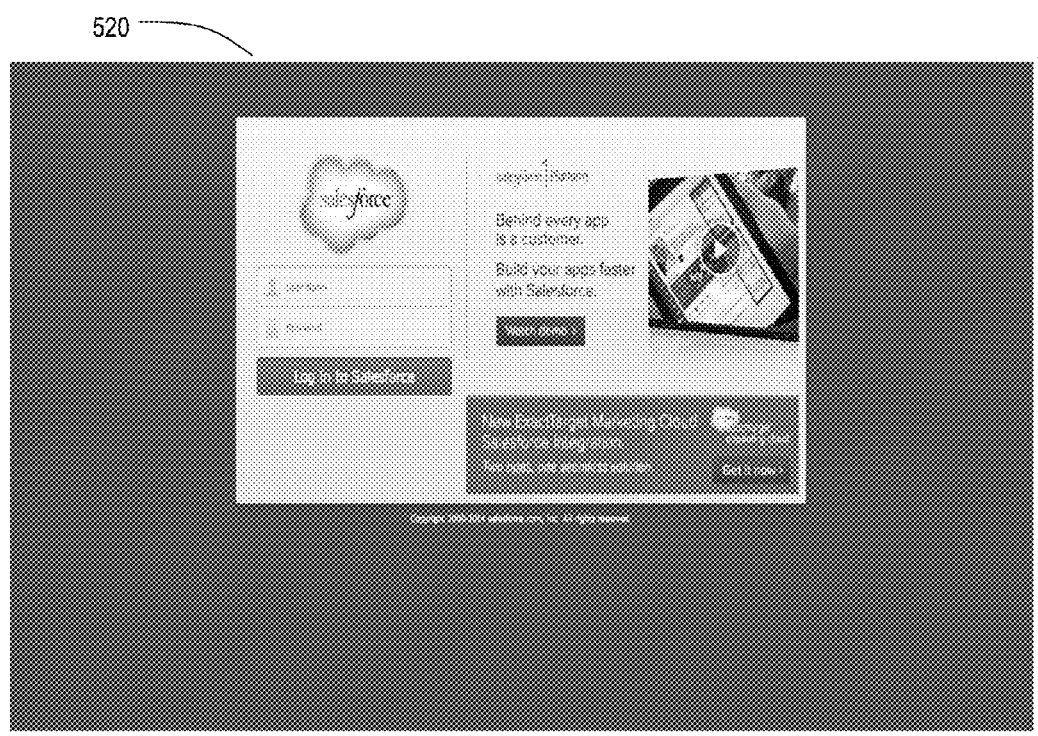
FIG. 5B  Sample User Experience with Theme 2 Parser Output

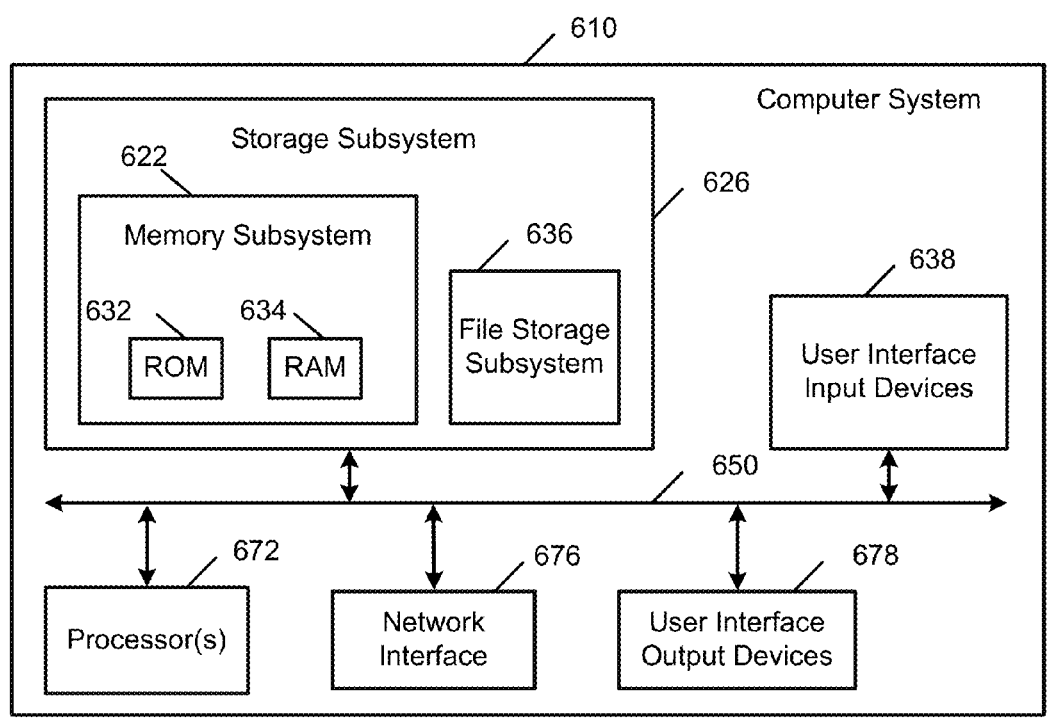
FIG. 6 Computer System

FAST CSS PARSER ENGINEERED FOR RUNTIME USE

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

The present invention relates to systems and methods for improving maintainability of code that displays data to users. The decision to personalize the experience for a user of a web-based application leads to a need to override existing hypertext markup language (HTML) code and cascading style sheet (CSS) specifications for pages.

Conventional approaches to rendering web pages for customers require that changes be implemented to CSS code specifications and existing HTML by appending additional CSS and/or adding HTML style attributes to existing code. A major drawback to adding either CSS or HTML style attributes is the increase in the size of the html code required to deliver the page. As the size increases, it becomes increasingly difficult to cache the page on the client side. A page customization requires the addition of style attribute tags. Because the data is not static, an entire HTML page must be passed from the backend server to the client server when a change is made to the CSS or html.

Browser-specific customizations also require an increase to the size of the CSS and html code used to deliver a page for a user typically.

CSS has become a widely used style sheet language for describing the format and visual representation of a document written in a markup language. CSS facilitates publication of content in multiple presentation formats based on nominal parameters. Almost all web pages use CSS style sheets to describe their presentation. CSS makes possible the separation of document content from document presentation, such as colors, fonts and layout—thus making it possible to render the same page differently depending on the screen size or device on which it is to be viewed. A cascading style sheet consists of a list of rules. A rule or rule-set consists of one or more selectors, and a declaration block. The selector points to the HTML element to be styled. The declaration block contains one or more declarations separated by semicolons. A declaration includes a property name and a value, separated by a colon.

```
/* p is a selector; color and text-align are declarations */
{
color:red;
text-align:center;
}
```

A CSS Parser inputs CSS source and typically produces an Abstract Syntax Tree (AST) tree—an object-based representation of the contents of the CSS source. This is usually done with the input of a formal grammar, which is the strict, machine-understandable rules for parsing a CSS source.

While there are different tools that accomplish CSS parsing, there is a lack of tools effectively designed to address the issues of performance, maintainability, and selective parsing of code at runtime. The most common technology in use today exacerbates the performance problems by requiring an increase in code size when customizations are implemented—a model that typically is costly in computer resources. Some customizations are not possible because the input grammar to the parser is fixed and not changeable. An opportunity arises to devise methods and structures that efficiently perform CSS parsing at runtime.

SUMMARY

The present invention relates to systems and methods for providing a CSS parser engineered for runtime usage to improve the maintainability of code that displays data to users. The technology disclosed also improves the performance and consistency of the code that delivers a user's experience. Particular aspects of the present invention are described in the claims, specification and drawings.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 3A and FIG. 3B are flowcharts for processing a login page customized for a specific instance, user and browser.

FIG. 4A through FIG. 4G show an example schema for an enablement of a runtime CSS parser engine.

FIG. 5A and FIG. 5B depict two example outputs rendered via implementations of a runtime CSS parser using two distinct sets of custom variables.

FIG. 6 is a block diagram of an example computer system for utilizing a runtime CSS parser environment.

DETAILED DESCRIPTION

Figure 1:
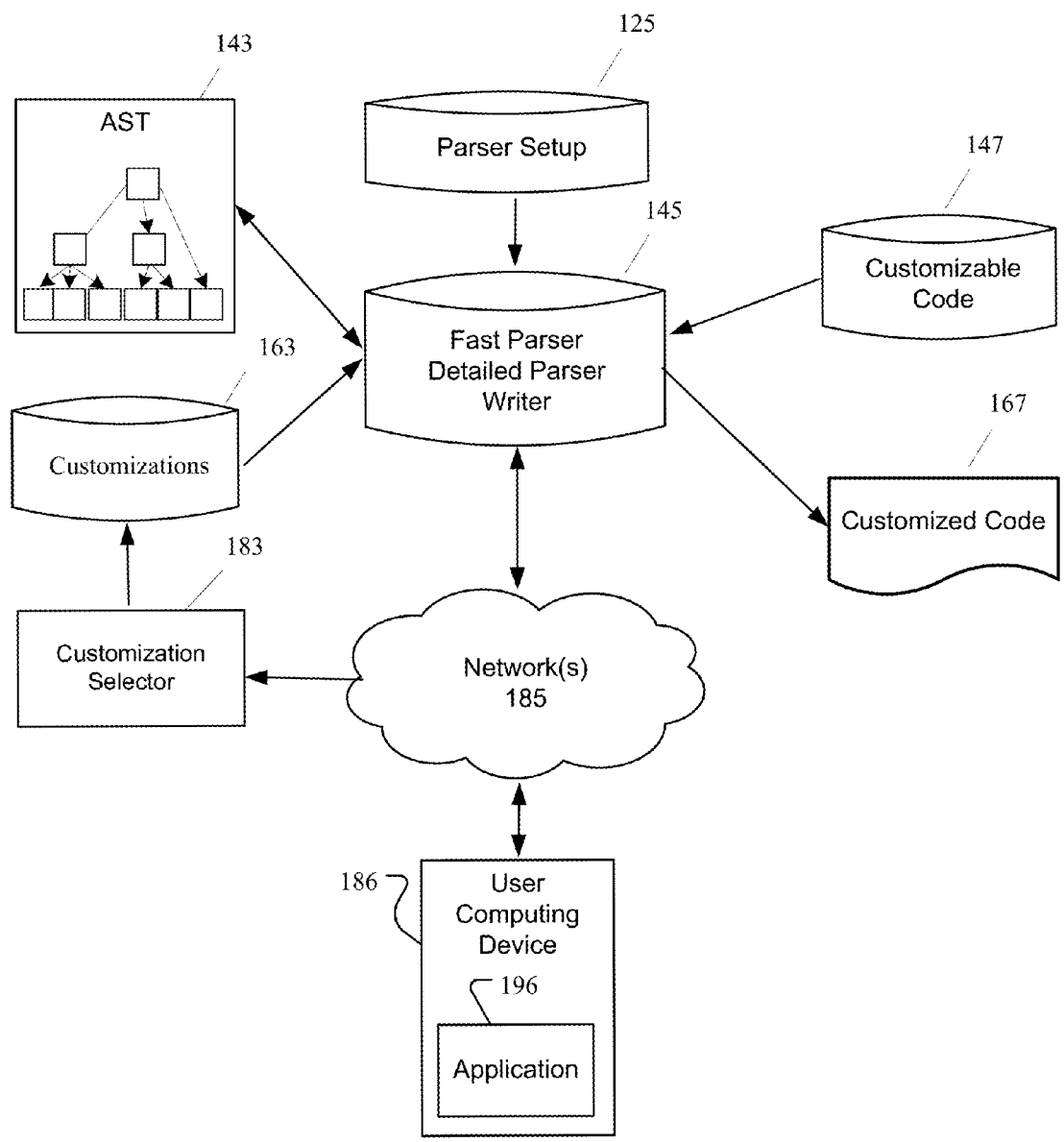
FIG. 1 shows a high level functional block diagram of a parsing environment.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

A CSS parser is a transformer—changing a set of CSS rules into deliverable code that is customized for a customer's unique experience. Application of a CSS parser at runtime is innovative, providing more technical flexibility and the ability to fine-tune page presentation and features for the best possible cross-device Web experience.

The technology disclosed relates to improving maintainability of code that displays data to users by: accessing in memory customizable segments of a CSS codebase 147 and target tokens in the segments to be customized; selecting at least one among multiple alternative sets of customizations 163 that transform the target tokens within the customizable segments 147 of a CSS codebase 147; scanning the codebase responsive to a user 186 invoking a module that uses the codebase 147 and locating the customizable code segments 147 specified by a selected set of customizations 163 based at least in part on an attribute of the user 186; parsing 145 the located customizable segments to produce segment parse trees 143 and further responsive to the user invoking the module, transforming the target tokens from the parsed customizable segment tree and outputting a customized codebase 167 to be used with the module invoked by the input. Code segments include, and are not limited to, key-value pairs in the form of key:value, and also blocks of related key-value pairs delimited within curly brackets { . . . }.

Examples of systems, apparatus, and methods according to the disclosed implementations are described in a sales context. The examples using customization of customers' login experience are being provided solely to add context and aid in understanding of the disclosed implementations. Other applications are possible, such that the following examples should not be taken as definitive or limiting either in scope, context or setting. It will thus be apparent to one skilled in the art that implementations may be practiced in or outside the sales query context.

The described subject matter is implemented by a computer-implemented system, such as a software-based system, a database system, a multi-tenant environment, or the like. Moreover, the described subject matter can be implemented in connection with two or more separate and distance computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Parsing Environment

FIG. 1 shows an example fast parsing environment 100 that provides a CSS parser engineered for runtime usage. FIG. 1 includes a parser setup engine 125, a fast parser, detailed parser and writer engine 145, and an abstract syntax tree (AST) engine 143. An application 196 runs on a user computing device 186 and communicates via a network 185 to a customization selector 183. The customizations engine 163 uses the customization selector 183 to determine which customizations a fast parser engine 145 will use to construct an AST 143. A writer 145 takes the parsed syntax tree and writes it out as customized code 167.

In other implementations, environment 100 may not have the same elements or components as those listed above and/or may have other/different elements or components instead of, or in addition to, those listed above, such as a web browser user interface, custom plugin engine, etc. The different elements or components can be combined into single software modules and multiple software modules can run on the same hardware.

In some implementations, network(s) 185 can be any one or any combination of Local Area Network (LAN), Wide Area Network (WAN), WiMAX, WiFi, telephone network, wireless network, point-to-point network, star network, token ring network, hub network, mesh network, peer-to-peer connections like Bluetooth, Near Field Communication (NFC), Z-Wave, ZigBee, or other appropriate configuration of data networks, including the Internet.

In some implementations, the engine can be of varying types including a workstation, server, computing cluster, blade server, server farm, or any other data processing system or computing device. The engine can be communicably coupled to the databases via a different network connection. For example, fast parser engine 145 can be coupled via the network 185 (e.g., the Internet) or to a direct network link.

In some implementations, databases of customizations 163 can store information from one or more customers into tables of a common database image to form a multi-customer on-demand database service (ODDS), which can be implemented in many ways, such as a multi-tenant database system (MTDS). A database image can include one or more database objects. In other implementations, the databases can be relational database management systems (RDBMSs), object oriented database management systems (OODBMSs), distributed file systems (DFS), no-schema database management systems, or any other data storing systems or computing devices.

In some implementations, user computing device 186 can be a personal computer, laptop computer, tablet computer, smartphone, personal digital assistant (PDA), digital image capture devices, and the like. Application 196 can take one of a number of forms, including user interfaces, dashboard interfaces, engagement consoles, and other interfaces, such as mobile interfaces, tablet interfaces, summary interfaces, or wearable interfaces. In some implementations, it can be hosted on a web-based or cloud-based privacy management application running on a computing device such as a personal computer, laptop computer, mobile device, and/or any other hand-held computing device. It can also be hosted on a local application running in an on-premise environment. In one implementation, application 196 can be accessed from a browser running on a computing device. The browser can be Chrome, Internet Explorer, Firefox, Safari, and the like. In other implementations, application 196 can run as an engagement console on a computer desktop application.

In some implementations, customizable code 147 includes a plurality of functionality and personas of a business entity. These personas represent various product offerings of the business entity, according to one implementation. In another implementation, they identify different events hosted by the business entity. In one example, Salesforce.com offers numerous products that provide different services and solutions. For instance, while Salesforce.com's 'Work.com' product is a social performance management platform that can be used for measuring and improving employee performance, its 'Data.com' product provides accurate business data that can used to drive higher sales. Salesforce.com, like many other business entities, has different personas for its different products. In some implementations, these personas exist as different profiles or groups on online social platforms like Chatter, Facebook, or Twitter. In other implementations, they exist as independent webpages on a master website.

In some implementations, customizations 163 holds profile metadata of the plurality of personas of a business entity. In particular, profile metadata include customizations such as logos, appearance of typeface, and background appearance in a display. In one implementation, profile metadata specifications use extensible markup language code (e.g., HTML) that identifies these codes using code parameters. In some implementations, profile metadata include a unique identifier or address, for example a Uniform Resource Locator (URL), which identifies the particular persona of the business entity and/or the online social platform on which the persona is hosted.

In some implementations, a customization selector 183 includes evaluating a block of text from the user computing device 186 including alpha characters, numeric characters, alphanumeric characters, American Standard Code for Information Interchange (ASCII) characters, symbols, or foreign language unicode (e.g. UTF-8).

Project Architecture Environment

Figure 2:
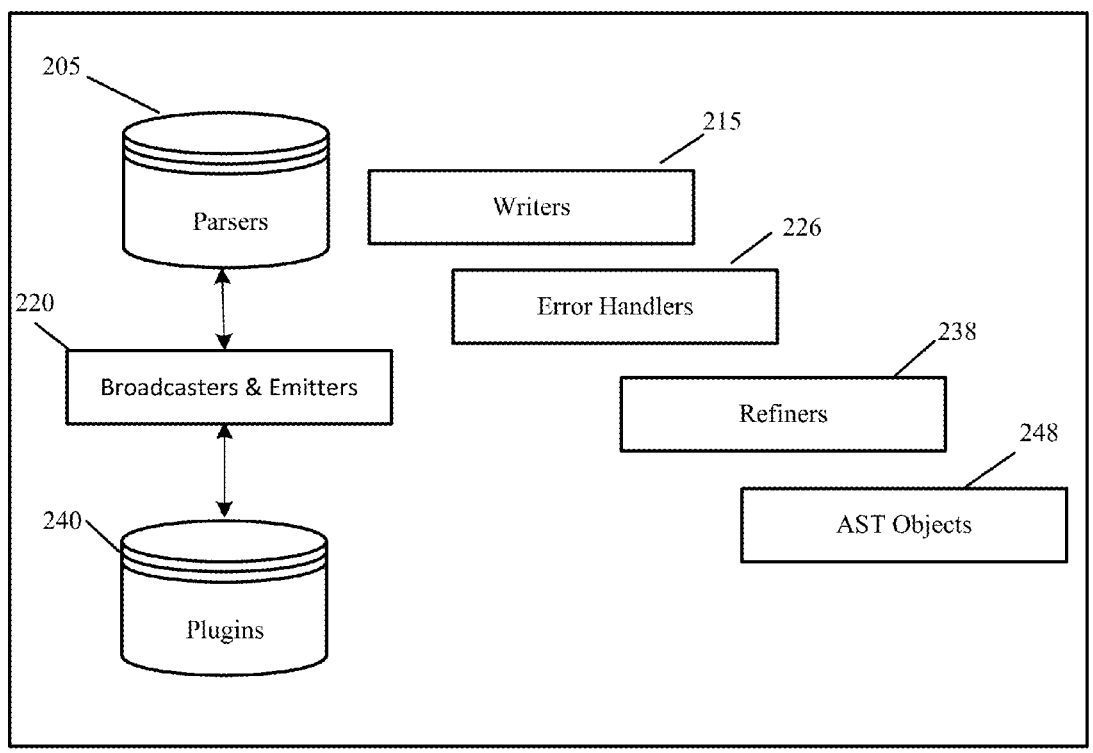
FIG. 2 depicts one implementation of a general computer architecture that includes a CSS parser engine.

FIG. 2 shows an example project architecture environment 200 that includes a parser 205, writers 215, error handlers 226, broadcasters and emitters 220, refiners 238, plugins 240 and AST objects 248. In some implementations, the engines can be of varying types including workstations, servers, computing clusters, blade servers, server farms, or any other data processing systems or computing devices.

In some implementations, a parser 205 employs a two-level parsing strategy, in which the first level extracts at-rules, selectors and declarations. The second-level parsing occurs individually per instance, and may be executed on certain instances. This two-level parsing strategy brings the parser performance to a level appropriate for runtime.

In some implementations, plugins 240 are registered during parser setup. A plugin 240 subscribes to one or more AST objects 248 to perform rework or validation of CSS code. For example, a prefixer plugin enables automatic vendor prefixing, analyzing prefixable selectors, properties, at-rules and function names and automatically prepending prefixed-equivalents based on the specified level of browser support. For example,

```
.class {
    border-radius: 3px;
}
gets translated into:
.class {
    -webkit-border-radius: 3px;
    -moz-border-radius: 3px;
    border-radius: 3px;
}
```

In this example, border-radius is an example target token that, when parsed, is replaced by the CSS code that specifies the border-radius for the browsers specified by the CSS plugin. The prefixer plugin maintains a list of browsers by version and properties need to be prefixed to support that browser, and determines which prefix to use based on whether the browser needs a prefix to be used by an application. Current browser data is retrieved from online website database information.

In some implementations, specific properties are supported by plugins 240. Custom plugins are created and used to rework CSS and define one or more subscription methods to a particular AST object (e.g., Selector or Declaration).

In some implementations, custom rework features of a parser 145 make it possible to change many aspects of the CSS—adding, changing or removing selectors, declarations or rules. The general pattern of performing rework includes using a class to add as many methods as desired, with the @Rework annotation and an argument that specifies the type of syntax unit to rework. The parser framework automatically invokes the method and performs any rework operations on the specified type of syntax unit. A particular plugin can have as many methods as needed; that is, rework and validation need not be separated into multiple classes.

In some implementations, syntax validation and linting are registered as plugins that auto-refine every selector, declaration and at-rule. In some implementations, a CSS parser 205 with an auto-refinement plugin ensures that customizable code 147 is valid CSS. Then during runtime, only the dynamic substitutions to the customizable code 147 need be parsed—to make runtime CSS modifications an effective option.

In some implementations, conditionals specify which CSS code segments to output. For example,

```
.button {
    background: linear-gradient(#aaa, #ddd);
}
@if (ie7) {
    .button {
        background: #aaa;
    }}
```

If "ie7" is passed in as a true condition then the code block will be retained, otherwise it will be removed.

In some implementations, conditions can be managed to specify which code segments will be used in a particular segment of customized code 167. Code segments include, and are not limited to, key-value pairs in the form of key:value, and also blocks of related key-value pairs delimited within curly brackets { . . . }.

For example:

```
Conditionals conditionals = new Conditionals( );
StyleWriter writer = StyleWriter.compressed( );
Omakase.source(input).request(conditionals).request(writer).process( );
// ie7
conditionals.manager( ).replaceTrueConditions("ie7");
String ie7 = writer.write( );
// firefox
conditionals.manager( ).replaceTrueConditions("firefox");
String firefox = writer.write( );
// chrome
conditionals.manager( ).replaceTrueConditions("webkit", "chrome");
String chrome = writer.write( );
```

In some implementations, a conditionals-collector plugin and a conditionals-validator plugin support the selection of specific code segments for a particular user instance.

AST objects 248 are data representations of CSS syntax units. Listed below are many examples of dynamic AST creation and modification that occur in some implementations:

```
// create a new selector
Selector selector = new Selector(new ClassSelector(".test"));
// another example
IdSelector theId = new IdSelector("main");
ClassSelector theClass = new ClassSelector("inner");
Selector selector = new Selector(theId, Combinator.descendant( ), theClass);
// append a simple selector part to an existing selector
selector.parts( ).append(new ClassSelector("another-class"));
// append a selector to a rule
rule.selectors( ).append(myNewSelector);
// alternative to above
someSelector.append(myNewSelector);
// change a value on a class selector
myClassSelector.name("the-new-name");
// check if a selector has a particular (class|id|type) simple selector
if (Selectors.hasClassSelector(selector, "myClass")) {...}
if (Selectors.hasClassSelector(selector, "myId")) {...}
if (Selectors.hasClassSelector(selector, "div")) {...}
// find the first matching (class|id|type) simple selector
```

```
Optional<ClassSelector> button = Selectors.findClassSelector(selector,
"button");
    if (button.isPresent( )) {
    System.out.println(button.get( ));
    }
```

```
// check if a 'div' type selector is adjoined to a class selector (e.g.,
"div.selector1")
if(Selectors.hasTypeSelector(Selectors.adjoining(selector1), "div")) {...}
```

More examples of dynamic AST creation and modification that occur in some implementations are listed below:

```
// create a new declaration
Declaration declaration = new Declaration(Property.DISPLAY,
KeywordValue.of(Keyword.NONE));
// another example
PropertyName name = PropertyName.using("new-prop");
Declaration declaration = new Declaration(name, KeywordValue.of("blah"));
// another example
NumericalValue val1 = NumericalValue.of(1, "px");
NumericalValue val2 = NumericalValue.of(5, "px");
PropertyValue value = TermList.ofValues(OperatorType.SPACE, val1, val2);
Declaration declaration = new Declaration(Property.MARGIN, value);
// another example
PropertyName prop =
PropertyName.using(Property.BORDER_RADIUS).prefix(Prefix.WEBKIT);
Declaration declaration = new Declaration(prop, KeywordValue.of(Keyword.NONE));
// append a declaration to a rule
rule.declarations( ).append(myNewDeclaration);
// create a new rule
Rule rule = new Rule( );
rule.selectors( ).append(new Selector(new ClassSelector("new")));
rule.declarations( ).append(new Declaration(Property.COLOR, HexColorValue.of("#fff")));
rule.declarations( ).append(new Declaration(Property.FONT_SIZE,
NumericalValue.of(1).decimalValue(5).
// check if a declaration is for a specific property name
if (declaration.isProperty(Property.DISPLAY)) {...}
if (declaration.isProperty("new-prop")) {...}
// check if a declaration has a value
PropertyValue value = declaration.propertyValue( );
Optional<KeywordValue> keyword = Values.asKeyword(value);
if (keyword.isPresent( )) {...}
// use the method appropriate to what value you think it is (e.g., based on the property name)
Optional<HexColorValue> color = Values.asHexColor(value);
Optional<NumericalValue> number = Values.asNumerical(value);
Optional<StringValue> string = Values.asString(value);
Optional<TermList> termList = Values.asTermList(value);
// change a property value
Optional<KeywordValue> keyword = Values.asKeyword(declaration.propertyValue( ));
if (keyword.isPresent( )) {
keyword.get( ).keyword(Keyword.NONE);
}
// remove (detach) a selector, declaration, rule, etc...
someSelector.detach( );
someDeclaration.detach( );
someRule.detach( );
```

In some implementations, a parser 205 includes subscription methods for performing validation and linting. For example, a method can declare the type of syntax to be validated as a first parameter and an error manager to report any problems as a second parameter. Here is an example of a class with two validation subscription methods:

```
public class Validations implements Plugin {
    @Validate
    public void validateRelativeFonts(Declaration declaration, ErrorManager em) {
        if (!declaration.isProperty(Property.FONT_SIZE)) return; // only process font-size
          property
        Optional<NumericalValue> number = Values.asNumerical(declaration.propertyValue( ));
        if (number.isPresent( ) && number.get( ).unit( ).equals("px")) {
            em.report(ErrorLevel.FATAL, declaration, "Font sizes must use relative units");
        }
    }
    @Validate
    public void validateIncludesUnprefixed(Declaration declaration, ErrorManager em) {
        // check that all prefixed declarations include an unprefixed declaration as well.
        PropertyName propertyName = declaration.propertyName( );
```

```
        if (propertyName.isPrefixed( )) {
            boolean found = false;
            String expected = propertyName.unprefixedName( );
            // go through each declaration in the block, looking for one with the unprefixed name
            for (Declaration d : declaration.group( ).get( )) {
                if (d.isProperty(expected)) {
                    found = true;
                    break;
                }
            }
        }
        if (!found) {
        em.report(ErrorLevel.WARNING, declaration, "Prefixed declaration without unprefixed
        }
      }
    }
  }
}
```

In some implementations, broadcasters and emitters 220 provide a bridge between parsers 205 and plugins 240. A broadcaster 220 receives AST objects 248 from a parser 145 and delivers them to a plugin 240. The AST object itself is the event, the plugins are the listeners, and the broadcasters are responsible for receiving the AST objects from the parsers and delivering them to registered subscriptions. The broadcasters can be wrapped inside of each other, relaying broadcasters to their inner broadcasters. For example, a QueingBroadcaster may be wrapped around an EmittingBroadcaster. The QueingBroadcaster may hold all of its broadcasts until a certain condition has been verified. The EmittingBroadcaster, which is responsible for using an Emitter to invoke the subscription methods, is typically located at the bottom of the chain.

A writer 215 delivers a parsed syntax tree as customized code 167. In some implementations, writers are customized to apply conditional logic, or append content to the customized code output.

In some implementations, error handlers 226 handle parser errors and errors generated from plugins. Refiners 238 handle standard and custom refinement of AST objects 248, which write out their content when a writer 215 requests output.

Flowcharts

FIG. 3A displays an implementation flowchart 300 for using vendor prefixing to specify a default browser. FIG. 3B displays a flowchart 300 showing the use of a custom variable function and an image rewriting function to customize a user experience by delivering customized code 167. For convenience, the flow charts described in this section are described with reference to assisting users, such as the example environment for delivering a customized home page for a sales application to a user. It should be understood that other system elements can be used to implement the method and that the method discloses technology that is not necessarily tied to the system elements used for convenience of description. Moreover, some implementations will combine the steps described in the steps or may split a step into multiple steps. Some results may be either pre-calculated or calculated on demand.

At action 310 a parser 205 identifies from browser type identification information provided by a requesting browser which browser is active for a specific user 186. At action 320, a parser 205 makes use of vendor prefixing to implement the browser choice specified by the user 186. At action 330, a writer engine 215 transmits data for display to a specific user by delivering customized code 167.

At action 340, a parser 205 identifies what theme is active for a specific user instance 186. At action 350, a parser 205 makes use of two rework classes: a CustomVariable function to specify background color and font, by making use of a value from a theme metadata file 436; and an ImageUrlRewrite function to activate a custom logo image from a theme metadata file 436. The function values are dependent on which customizations 163 are active. At action 360, a writer engine 215 transmits customized code 167 for display for a specific user 186.

The features disclosed herein may be implemented on many different types of systems. However, the examples herein are described with a focus on an on-demand services environment. A multi-tenant database system, such as SALESFORCE.COM, is one example of an on-demand services environment. Other database systems, such as WORK.COM (formerly Rypple), DATA.COM, marketing automation services, such as MARKETING CLOUD (including radian6, ExactTarget, and BuddyMedia), as well as enterprise social networks, such as CHATTER COMMUNITIES, are other examples of on-demand services environments.

Customizations with Prefixing, and Custom Variables and Image URL Rewriter Functions CSS parsers 205 employ a 2-level parsing strategy. The first level analyzes CSS source and extracts the at-rules, selectors and declarations (and no more). Any errors at this grammatical level will be caught at this step (for example, a missing curly bracket to close a rule). Any errors at a more specific level (i.e. within a selector or within a declaration) will not be caught until that particular object is refined. Second level parsing occurs individually per instance (for example, for a particular Selector or Declaration instance). Second level parsing is only executed on certain instances. This 2-level process makes it possible to specify what gets parsed. For example, on a first parsing pass, we may want to parse and validate the CSS code in a project, but on a second pass we may not care about fully parsing selectors anymore. This level of detail makes possible opportunities for better performance, which is especially important in a production environment. For example, the code base for a Salesforce application may contain 10,000 lines of CSS code. When a specific customer logs in to the Salesforce engine, their needs may require the use of ten percent of the available functionality. In this case, 1,000 lines of CSS code may need to be parsed to serve that customer.

When a parser 205 has successfully parsed a CSS code segment, it will construct the appropriate AST object 248 and transmit it to a broadcaster 220. The customized code 167 delivers a user experience—in our example a login webpage with the color scheme and logo customizations 163 for the specific user.

FIG. 4A through FIG. 4G illustrate an example schema 400 for an enablement of a runtime CSS parser engine. These examples are shown in JAVA, a popular and efficient programming language. While JAVA is used to illustrate the present invention, the invention is independent of the use of a specific programming language. These examples display vendor prefixing to specify which browsers are supported. Additionally, two functions—A. ImageUrlRewrite, and B FIG. 4B shows a fast CSS parser rework example, Rework1-CustomVariables.java 420, for a fast parser 145. The CustomVariables customization function 422 is written such that the second fallback value will be used if the metadata file does not define a value for the name. Note that Omakase is the name of an example implementation of a CSS parser developed in JAVA. Note also the inclusion of refiners 238 in the example.

```
Rework1-CustomVariables.java
package com.salesforce.omakase.server;
***
public class CustomVariables implements SyntaxPlugin {
    private static final Yaml yaml = new Yaml( );
    private final VariableFunction variableFunction;
    public CustomVariables(File theme) throws IOException {
        String themeSource = Files.toString(theme, Charsets.UTF_8);
        Map<String, String> variables = (Map)yaml.load(themeSource);
        variableFunction = new VariableFunction(variables);
    }
    @Override
    public void registerRefiners(RefinerRegistry registry) {
        registry.register(variableFunction);
    }
    public static final class VariableFunction implements FunctionRefiner {
        private final Map<String, String> variables;
        public VariableFunction(Map<String, String> variables) {
            this.variables = variables;
        }
        @Override
        public boolean refine(RawFunction raw, Broadcaster broadcaster, GenericRefiner refiner) {
            if (!raw.name( ).equals("v")) return false;
            List<String> args = Args.get(raw.args( ));
            if (args.size( ) != 2) throw new RuntimeException("Expected to find two args");
            String name = args.get(0);
            String fallback = args.get(1);
            String resolved = variables.containsKey(name) ? variables.get(name) : fallback;
            Source source = new Source(resolved, raw.line( ), raw.column( ));
            ParserFactory.termSequenceParser( ).parse(source, broadcaster, refiner);
            return true;
        }
    }
}
```

CustomVariables—provide examples of ways to implement customization of a user's experience when they log in to the home page of a Salesforce application.

FIG. 4A illustrates an example parser setup 125, ParserJavaSetup.java 410, with vendor prefixing 412 to support specific browsers. Additionally, this example parser setup file displays a variables customization function 414 and an image url rewriting function 416 to be used by a fast parser 145 to personalize a user's home page based on a customization selector 183 that will be simulated for these examples.

```
ParserJavaSetup.java
***
// vendor prefixing
Prefixer prefixer = Prefixer.defaultBrowserSupport( );
prefixer.support( ).all(Browser.FIREFOX);
prefixer.support( ).all(Browser.CHROME);
prefixer.support( ).all(Browser.IE);
// variables custom function
String themeName = "two";
File theme = new
File(context.getRealPath(String.format(THEME_PATH, themeName)));
CustomVariables variables = new CustomVariables(theme);
// image url rewrite
ImageUrlRewrite urls = new ImageUrlRewrite( );
***
return verbose.write( );
}
```

The rework code selects variable values from two example metadata files shown in FIG. 4C: metadata-theme1.yaml 436 and metadata-theme2.yaml 437, based on a customization selector 183.

```
metadata-theme1.yaml 436 (customer 1)
main-color: "#2a94d6"
main-font: Helvetica
logo: url(/resources/img/logo1.png)
metadata theme 2 yaml 437 (customer 2)
main-color: "#cc3300"
main-font: Verdana
logo: url(/resources/img/logo2.png)
```

FIG. 4C illustrates an example of customizable code 147, source.html 430, as-is before it has been parsed with CSS files. FIG. 4C also shows an example customization 163. css-original-a.css 432 includes a custom variables customization function v to identify font and color.

```
Original CSS code: css-original-a.css 432
body {
    font-weight: 300;
    font-family: v(main-font, Helvetica);
    background: v(main-color, white);
}
```

FIG. 4C also shows two theme CSS files that provide values for font and background color for two different user themes: css-output-theme1-a.css 433 and css-output-theme2-a.css 434.

```
Output Theme 1A code: css-output-theme1-a.css 433
body {
    font-weight: 300;
    font-family: Helvetica;
    background: #2a94d6;
}
Output Theme 2A code: css-output-theme2-a.css 434
body {
    font-weight: 300;
    font-family: Verdana;
    background: #cc3300;
}
```

FIG. 4D shows a fast parser 145 rework example, Rework2-ImageUrlRewrite.java 440. The ImageUrlRewrite customization function uses the URL for a customer-specific logo image, from the metadata theme files shown in FIG. 4C—metadata-theme1.yam1 436 and metadata-theme2.yam1 437—selecting a specific metadata file indicated by a customization selector 183.

```
Rework2-ImageUrlRewrite.java 440
package com.salesforce.omakase.server;
import com.salesforce.omakase.ast.declaration.UrlFunctionValue;
import com.salesforce.omakase.broadcast.annotation.Rework;
import com.salesforce.omakase.plugin.Plugin;
public class ImageUrlRewrite implements Plugin {
    private static final long TIMESTAMP = System.currentTimeMillis( );
    @Rework
    public void rewrite(UrlFunctionValue urlFunction) {
        if (!urlFunction.url( ).contains("?")) {
            urlFunction.url(urlFunction.url( ) + "?cb=" +
            TIMESTAMP);
        }
    }
}
```

FIG. 4E shows the CSS customizable code 147, css-original-b.css 450, parsed with source.html 430, to include CustomVariables function 452 before the variables have been replaced by logo 452 and font 454 from the metadata files.

```
css-original-b.css 450
.content {
    width: 800px;
    margin: 60px auto;
}
***
.logo > img {
    background: v(logo, "url(/resources/img/logo1.png)") center
    no-repeat;
    width: 230px;
    height: 110px;
}
***
.login-button {
    cursor: pointer;
    margin-top: 10px;
    width: 100%;
    border: 1px solid #4176ba;
    color: white;
    font-size: 17px;
    padding: 9px 20px;
    border-radius: 3px;
    font-weight: 300;
    font-family: v(main-font, Helvetica);
```

```
    background: linear-gradient(to top, #2789c7 0%, #3f9fd9 100%);
    text-shadow: 0px -1px 0px rgba(0,0,0,0.3);
}
***
.copyright {
    font-size: 10px;
    color: #ffffff;
    text-align: center;
}
```

FIG. 4F shows the CSS customizable code 147, css-output-theme1-b.css 460, parsed with source.html 430, after the vendor prefixing 462, the ImageUrlRewrite customization function 464 and the CustomVariables customization function 466 values are parsed for Theme 1. Note the addition of a cachebuster to the end of the URLs—a unique piece of code that prevents a browser from reusing an image it has already seen and cached, or saved, to a temporary memory file. Without the cachebuster the website would reuse the cached logo data that had been displayed before the page reloaded. Flexibility for rendering web pages using different browsers is added by customization based on which browser a customer uses.

```
css-output-theme1-b.css 460
.content {
    width: 800px;
    margin: 60px auto;
}
.login-panel {
    display: flex;
    -webkit-border-radius: 3px;
    -moz-border-radius: 3px;
    border-radius: 3px;
    -webkit-box-shadow: 0px 2px 7px rgba(0, 0, 0, 0.40);
    -moz-box-shadow: 0px 2px 7px rgba(0, 0, 0, 0.40);
    box-shadow: 0px 2px 7px rgba(0, 0, 0, 0.40);
    margin: 50px auto 10px auto;
    padding: 10px;
    background: -webkit-linear-gradient(#fafafa, #e5e5e5);
    background: -moz-linear-gradient(#fafafa, #e5e5e5);
    background: linear-gradient(#fafafa, #e5e5e5);
}
***
.logo > img {
    background: url(/resources/img/logo1.png?cb=1400704769893)
    center no-repeat;
    width: 230px;
    height: 110px;
}
***
.login-input .first {
    padding-left: 40px;
    background: #f3f5f6
    url(/resources/img/user188.png?cb=1400704769893) 6px 9px
    no-repeat;
    -webkit-box-shadow: inset 0px 1px 1px 0px rgba(0,0,0,0.2);
    -moz-box-shadow: inset 0px 1px 1px 0px rgba(0,0,0,0.2);
    box-shadow: inset 0px 1px 1px 0px rgba(0,0,0,0.2);
    -webkit-border-top-left-radius: 3px;
    -moz-border-top-left-radius: 3px;
    border-top-left-radius: 3px;
    -webkit-border-top-right-radius: 3px;
    -moz-border-top-right-radius: 3px;
    border-top-right-radius: 3px;
}
.login-input .last {
    border-top: 0;
    padding-left: 40px;
    background: #f3f5f6
    url(/resources/img/lock188.png?cb=1400704769893) 6px 9px
    no-repeat;
    -webkit-border-bottom-left-radius: 3px;
    -moz-border-bottom-left-radius: 3px;
```

-continued

```
    border-bottom-left-radius: 3px;
    -webkit-border-bottom-right-radius: 3px;
    -moz-border-bottom-right-radius: 3px;
    border-bottom-right-radius: 3px;
}
.login-button {
    cursor: pointer;
    margin-top: 10px;
    width: 100%;
    border: 1px solid #4176ba;
    color: white;
    font-size: 17px;
    padding: 9px 20px;
    -webkit-border-radius: 3px;
    -moz-border-radius: 3px;
    border-radius: 3px;
    font-weight: 300;
    font-family: Helvetica;
    background: -webkit-linear-gradient(bottom, #2789c7 0%, #3f9fd9 100%);
    background: -moz-linear-gradient(bottom, #2789c7 0%, #3f9fd9 100%);
    background: linear-gradient(to top, #2789c7 0%, #3f9fd9 100%);
    text-shadow: 0px -1px 0px rgba(0,0,0,0.3);
}
***
.copyright {
    font-size: 10px;
    color: #ffffff;
    text-align: center;
}
```

FIG. 4G shows the CSS customizable code 147, css-output-theme2-b.css 470, parsed with source.html 430, after the vendor prefixing 462, the ImageUrlRewrite customization function 464 and the CustomVariables customization function 466 values are parsed for Theme 2 (customer 2). Note that the changed code snippets are shown below, for brevity. In summary, the background color and the logo are specified differently in the metadata files for customer 1 compared to customer 2, and these files are parsed to deliver a customized home page for a customer login.

```
css-output-theme2-b.css 470
...
.logo > img {
    background: url(/resources/img/logo2.png?cb=1400704769893)
    center no-repeat;
    width: 230px;
    height: 110px;
}
***
.login-button {
    cursor: pointer;
    margin-top: 10px;
    width: 100%;
    border: 1px solid #4176ba;
    color: white;
    font-size: 17px;
    padding: 9px 20px;
    -webkit-border-radius: 3px;
    -moz-border-radius: 3px;
    border-radius: 3px;
    font-weight: 300;
    font-family: Verdana;
    background: -webkit-linear-gradient(bottom, #2789c7 0%, #3f9fd9 100%);
    background: -moz-linear-gradient(bottom, #2789c7 0%, #3f9fd9 100%);
    background: linear-gradient(to top, #2789c7 0%, #3f9fd9 100%);
    text-shadow: 0px -1px 0px rgba(0,0,0,0.3);
}
```

FIG. 5A displays a sample output login screen for Theme 1 510 and FIG. 5B displays a sample output login screen for Theme 2 520. That is, the runtime CSS parser 205 displays a background color and logo customized based on a customer login.

Computer System

FIG. 6 is a block diagram of an example computer system 600 that includes a runtime-optimized CSS Parser. Computer system 610 typically includes at least one processor 672 that communicates with a number of peripheral devices via bus subsystem 650. These peripheral devices can include a storage subsystem 626 including, for example, memory devices and a file storage subsystem, user interface input devices 638, user interface output devices 678, and a network interface subsystem 676. The input and output devices allow user interaction with computer system 610. Network interface subsystem 676 provides an interface to outside networks, including an interface to corresponding interface devices in other computer systems.

User interface input devices 638 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include possible types of devices and ways to input information into computer system 610.

User interface output devices 678 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 610 to the user or to another machine or computer system.

Storage subsystem 626 stores programming and data constructs that provide the functionality of some or all of the modules and methods described herein. These software modules are generally executed by processor 672 alone or in combination with other processors.

Memory 622 used in the storage subsystem can include a number of memories including a main random access memory (RAM) 634 for storage of instructions and data during program execution and a read only memory (ROM) 632 in which fixed instructions are stored. A file storage subsystem 636 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 136 in the storage subsystem 624, or in other machines accessible by the processor.

Bus subsystem 650 provides a mechanism for letting the various components and subsystems of computer system 610 communicate as intended. Although bus subsystem 650 is shown schematically as a single bus, alternative implementations of the bus subsystem can use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as one example. Many other configurations of computer system 610 are possible having more or fewer components than the computer system depicted in FIG. 6.

Particular Implementations

In one implementation, we describe a method that can be applied to transforming a cascading style sheet ("CSS") codebase for a website. The method is based on a computer that includes memory. The memory is loaded with a CSS codebase that includes target tokens—identifiers, keywords, separators, operators, literals and comments—in customizable segments. Code segments include, and are not limited to, key-value pairs in the form of key:value, and also blocks of related key-value pairs delimited within curly brackets { . . . }. These segments are customized, responsive to an input that invokes a web page or application module that uses the CSS codebase. The method selects at least one among multiple alternative sets of customization functions (i.e., a variables customization function or an image url rewriting function) that transform the target tokens within the customizable segments of the CSS codebase. The method scans the CSS codebase and locates the customizable segments that include the target tokens, and parses the located customizable segments to produce segment parse trees. Further, the method transforms the target tokens from the segment parse trees according to the customization functions and outputs a customized codebase to be used with the module invoked by the input.

This method and other implementations of the technology disclosed can include one or more of the following features and/or features described in connection with additional methods disclosed.

In some implementations, a method includes the target token combined with application display type identification information provided by a requesting application and used to select customized data for display according to an application display interface used with the module. In other implementations, a method may include a customizable segment parsed to produce the segment parse tree that includes the target token and at least a segment in the form of blocks of related key-value pairs delimited within curly brackets { . . . }. In other implementations, a method includes the customizable segment parsed to produce the segment parse tree that includes the target token and at least a block of related key-value pairs delimited between a pair of delimiter characters.

In some implementations, a method may include a customization function that specifies a logo, the appearance of typeface in a display, or a background appearance in a display.

In another implementation, we describe a system implemented that can be applied to transforming a cascading style sheet ("CSS") codebase for a website. The system can practice any of the methods described in this application, including the method described above. For instance, the system is based on a computer that includes memory. The memory is loaded with a CSS codebase that includes target tokens—identifiers, keywords, separators, operators, literals and comments—in customizable segments. Code segments include, and are not limited to, key-value pairs in the form of key:value, and also blocks of related key-value pairs delimited within curly brackets { . . . }. These segments are customized, responsive to an input that invokes a web page or application module that uses the CSS codebase. The system selects at least one among multiple alternative sets of customization functions (i.e., a variables customization function or an image url rewriting function) that transform the target tokens within the customizable segments of the CSS codebase. The system scans the CSS codebase and locates the customizable segments that include the target tokens, and parses the located customizable segments to produce segment parse trees. Further, the system transforms the target tokens from the segment parse trees according to the customization functions and outputs a customized codebase to be used with the module invoked by the input.

Any of the method aspects described above can be used in the system, including combinations of the aspects described above.

In some implementations, a system may include a target token that is accompanied by parameters that identify the customization function invoked, and that provides a default value if the identified customization function is not defined for the selected set of customization functions. In other implementations, a system may include a target token used to select a customized logo used in a display. In some implementations, a system includes a customization function that specifies a background appearance in a display.

In some implementations, a system includes a customization function that is responsive at least in part to the target token and at least a key-value pair. In other implementations, a system may include a customization function that is responsive to the target token and at least a segment in the form of blocks of related key-value pairs delimited within curly brackets { . . . }.

In some implementations, a computer readable memory holds code that, when executed, includes the selection of the set of customization functions is responsive, at least in part, to a computer-implemented system that transforms a cascading style sheet ("CSS") codebase for a website. This memory holds code that, when executed, causes the processor to access in a second memory a CSS codebase that includes target tokens in customizable segments to be customized. These targets are responsive to an input, invoking a module that uses the CSS codebase to select at least one among multiple alternative sets of customization functions that transform the target tokens within the customizable segments of the CSS codebase. This memory holds code that scans the CSS codebase and locates the customizable segments that include the target tokens; parses the located customizable segments to produce segment parse trees; and transforms the target tokens from the segment parse trees according to the customization functions and output a customized codebase to be used with the module invoked by the input. In some implementations, the target token includes an identifier accompanied by parameters that identify the customization function invoked and that provide a default value if the identified customization function is not defined for the selected set of customization functions.

In some implementations, a computer readable memory holds code that, when executed, includes the customizable segment parsed to produce the segment parse tree that includes the target token and at least a key-value pair. In other implementations, a computer readable memory holds code that, when executed, includes the customizable segment parsed to produce the segment parse tree that includes the target token and at least a block of related key-value pairs delimited within curly brackets { . . . }. nIn yet other implementations, a computer readable memory holds code that, when executed, includes the customization function that specifies a background appearance in a display.

In some implementations, a computer readable memory holds code that, when executed, includes the selecting the set of customization functions that is responsive, at least in part, to the target token and at least a key-value pair. In other implementations, a computer readable memory holds code that, when executed, includes the selecting the set of customization functions that is responsive, at least in part, to the target token and at least a block of related key-value pairs delimited within curly brackets { . . . }.

Any of the method and system aspects described above can be implemented in computer readable memory, including combinations of the aspects described above.

While the present technology is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the technology and the scope of the following claims.

What is claimed is:

1. A computer-implemented method of transforming a cascading style sheet ("CSS") codebase for a website, including:
    using a processor, accessing in memory a CSS codebase that includes target tokens in customizable segments to be customized, responsive to an input invoking a module that uses the CSS codebase;
    selecting at least one set of customization functions among multiple alternative sets of customization functions that transform the target tokens within the customizable segments of the CSS codebase;
    scanning the CSS codebase and locating the customizable segments of the CSS codebase that include the target tokens and at least a block of related key-value pairs, customization of the customizable segments of the CSS codebase being located based at least in part on an attribute of a user;
    parsing, at runtime, only the located customizable segments of the CSS codebase to produce segment parse trees based on the parsed customizable segments; and
    transforming the target tokens from the segment parse trees according to the selected set of customization functions and outputting a customized codebase to be used with the module invoked by the input.

2. The method of claim 1, wherein a target token of the target tokens is combined with application display type identification information provided by a requesting application and used to select customized data for display according to an application display interface used with the module.

3. The method of claim 1, wherein the located customizable segments parsed to produce the segment parse trees include the target token and at least the block of related key-value pairs, the related key-value pairs being delimited within curly brackets { . . . }.

4. The method of claim 1, wherein the located customizable segments parsed to produce the segment parse trees include the target token and at least the block of related key-value pairs, the related key-value pairs being delimited between a pair of delimiter characters.

5. The method of claim 1, wherein a customization function of the selected set of customization functions specifies a logo used in a display.

6. The method of claim 1, wherein a customization function of the selected set of customization functions specifies an appearance of a typeface in a display.

7. The method of claim 1, wherein a customization function of the selected set of customization functions specifies a background appearance in a display.

8. A computer-implemented system that transforms a cascading style sheet ("CSS") codebase for a website, including:
    a processor and first memory, the first memory holding code that, when executed, causes the processor to:
        access in a second memory a CSS codebase that includes target tokens in customizable segments to be customized, responsive to an input invoking a module that uses the CSS codebase;
        select at least one set of customization functions among multiple alternative sets of customization functions that transform the target tokens within the customizable segments of the CSS codebase;
        scan the CSS codebase and locate the customizable segments of the CSS codebase that include the target tokens and at least a block of related key-value pairs, customization of the customizable segments of the CSS codebase being located based at least in part on an attribute of a user;
        parse, at runtime, only the located customizable segments of the CSS codebase to produce segment parse trees based on the parsed customizable segments; and
        transform the target tokens from the segment parse trees according to the selected set of customization functions and output a customized codebase to be used with the module invoked by the input.

9. The system of claim 8,
    wherein a target token of the target tokens includes an identifier accompanied by parameters that identify an invoked customization function, and
    wherein the target token provides a default value if the identified customization function is not defined for the selected set of customization functions.

10. The system of claim 8, wherein a target token of the target tokens is used to select a customized logo used in a display.

11. The system of claim 8, wherein a customization function of the selected set of customization functions specifies a background appearance in a display.

12. The system of claim 8, wherein the selecting of the at least one set of customization functions is responsive, at least in part, to a target token of the target tokens and at least a key-value pair of the block of related key-value pairs.

13. The system of claim 8, wherein the selecting of the at least one set of customization functions is responsive, at least in part, to a target token of the target tokens and at least the block of related key-value pairs, the related key-value pairs being delimited within curly brackets { . . . }.

14. A non-transitory computer readable storage medium impressed with computer program instructions to transform a cascading style sheet ("CSS") codebase for a website, the instructions, when executed on a processor, implement a method comprising:
    accessing in a memory a CSS codebase that includes target tokens in customizable segments to be customized, responsive to an input invoking a module that uses the CSS codebase;
    selecting at least one set of customization functions among multiple alternative sets of customization functions that transform the target tokens within the customizable segments of the CSS codebase;
    scanning the CSS codebase and locating the customizable segments of the CSS codebase that include the target tokens and at least a block of related key-value pairs, customization of the customizable segments of the CSS codebase being located based at least in part on an attribute of a user;

parsing, at runtime, only the located customizable segments of the CSS codebase to produce segment parse trees based on the parsed customizable segments; and transforming the target tokens from the segment parse trees according to the selected set of customization functions and outputting a customized codebase to be used with the module invoked by the input.

15. The non-transitory computer readable storage medium of claim 14, wherein the customizable segments parsed to produce the segment parse trees include the target tokens and at least a key-value pair of the block of related key-value pairs.

16. The non-transitory computer readable storage medium of claim 14, wherein the customizable segments parsed to produce the segment parse trees include the target tokens and at least the block of related key-value pairs, the key-value pairs being delimited within curly brackets { . . . }.

17. The non-transitory computer readable storage medium of claim 14, wherein the at least one customization function specifies a background appearance in a display.

18. The non-transitory computer readable storage medium of claim 14, wherein the selecting of the at least one set of customization functions is responsive, at least in part, to a target token of the target tokens and at least a key-value pair of the block of related key-value pairs.

19. The non-transitory computer readable storage medium of claim 14, wherein the selecting of the at least one set of customization functions is responsive, at least in part, to a target token of the target tokens and at least the block of related key-value pairs, the related key-value pairs being delimited within curly brackets { . . . }.

* * * * *